Patented Dec. 13, 1932

1,890,874

UNITED STATES PATENT OFFICE

PAUL E. WESTON, OF SEWAREN, NEW JERSEY, ASSIGNOR, BY MESNE ASSIGNMENTS, TO THE ROESSLER & HASSLACHER CHEMICAL COMPANY, A CORPORATION OF DELAWARE

MANUFACTURE OF HYDROGEN IODIDE

No Drawing. Application filed February 25, 1930. Serial No. 431,337.

This invention relates to the manufacture of hydrogen iodide by the direct union of hydrogen and iodine.

Prior to my invention, hydrogen iodide had not been made in any substantial amount by the direct union of hydrogen and iodine. The elements will react as gases at high temperatures, but the union is very slow and incomplete. It has been stated that the combination of hydrogen and iodine is a reversible reaction, 82% complete at 283° C., and 76% complete at 508° C. The methods utilized for its preparation have been such reactions as that occurring between sodium iodide and phosphoric acid, or such as phosphorus tri iodide and water. Hydrogen iodide has been made by the reduction of iodine by means of hydrogen sulphide in water.

The object of this invention is the formation of hydrogen iodide, and more specifically aqueous solutions of hydrogen iodide, by the direct union of the elements hydrogen and iodine.

I have discovered that if iodine and water are mixed in any desired proportions, for example, equal parts by weight, and are then heated and agitated with hydrogen under pressure in any suitable vessel, the iodine and hydrogen will combine to form a clear, colorless solution of hydrogen iodide. It is not necessary to use excessively high temperatures; the reaction will take place at a temperature as low as 100° C., and takes place at temperatures ranging between about 100° C. and 300° C. While the reaction undoubtedly proceeds at low pressures it is desirable to use pressures above atmospheric to increase the rate of reaction. The pressures used may be moderate, a pressure of 200 pounds per square inch being sufficient for economic speeds of reaction. The reaction, however, proceeds more rapidly at higher pressures. Obviously, there is no practical advantage in, though no objection to, going to super pressures of 1000 pounds or over. I have found that the reaction proceeds with fair rapidity at 300 pounds per square inch, although I have so far preferred to operate at 700–800 pounds per square inch. Various reaction media, solvents for iodine and/or hydrogen iodide may be used, such as, for example, water, acetic acid, carbon tetrachloride, toluene, stannic chloride, etc.

I have found that the optimum temperature range is between approximately 150° C. to 200° C. In this range the HI formation is quite rapid and the temperatures are not such as to cause undue problems in the apparatus and operation.

I have also found that catalysts may be used to speed up the rate of HI formation thus rendering possible economical operation at lower temperatures and pressures than would otherwise be used. In view of this fact, I do not wish to limit my invention to any minimum temperatures or pressures except those as may be most economic in view of the considerations of speed; the reaction is the same regardless of the conditions. As catalysts, I have found that such materials as chromic chloride, stannic chloride or nickel chloride are suitable. These materials are merely added in small amounts to the aqueous reaction mixture.

I have found that the rate of hydrogen iodide formation may also be speeded up by initially dissolving hydrogen iodide in the reaction medium to be used and then dissolving or partially dissolving the iodine in the solution thus produced.

The following examples will illustrate my invention. The concentrations of the solution used and the like may vary, depending on the concentration of the hydrogen iodide desired in the final solution.

*Example 1.*—Equal parts by weight of iodine and water were placed in a glass vessel, which in turn was enclosed in a steel bomb in a shaker apparatus, and connected to a source of hydrogen under pressure. Hydrogen was admitted until a pressure of 600 pounds per square inch was reached, and the mixture heated to 150° C. and agitated at this temperature for 10 hours while maintaining the hydrogen pressure. The resulting product was a clear, aqueous solution of hydrogen iodide in water, of about 50% strength; substantially all of the iodine was converted to hydrogen iodide, tests indicating that the iodine was 99.9% converted.

*Example 2.*—5 parts by weight of iodine and 50 parts by weight of glacial acetic acid were treated as in Example 1. At the end of 5 hours, 76% of the iodine was converted into hydrogen iodide dissolved in acetic acid.

This reaction may be carried out in bombs constructed of any material resistant to the action of the hydrogen iodide in whatever media is used. Glass is suitable, but this requires an external metallic retaining bomb. I have secured excellent results with a tantalum lined steel bomb.

*Example 3.*—As indicative of the effect of catalysts the following example is given. A mixture of 10 grams of iodine with 10 grams of water was agitated while supplying hydrogren thereto at a pressure of 700 pounds per square inch, and at a temperature of 130° C. in a glass vessel contained in a steel bomb. Two such mixtures were utilized, the one without a catalyst and the second containing 0.5 grams chromic chloride. In the mixture without the catalyst the reduction was 50% complete in 2.1 hours, whereas the mixture containing the catalyst the reduction was 50% complete in 0.9 hours.

I claim:

1. A process for the preparation of hydrogen iodide, which comprises reacting iodine in the presence of a solvent for either iodine or hydrogen iodide or a common solvent for both with hydrogen.

2. A process for the preparation of hydrogen iodide, which comprises reacting iodine in the presence of a solvent for either iodine or hydrogen iodide or a common solvent for both with hydrogen at elevated temperature and pressure.

3. A process for the preparation of hydrogen iodide, which comprises reacting iodine in the presence of a solvent for either iodine or hydrogen iodide or a common solvent for both with hydrogen at a temperature between 100° C. and 300° C., and under pressures above atmospheric.

4. A process for the preparation of hydrogen iodide, which comprises reacting iodine in the presence of a solvent for either iodine or hydrogen iodide or a common solvent for both with hydrogen at a temperature between 150° C. and 200° C., and at pressures of over 200 pounds per square inch.

5. A process for the preparation of hydrogen iodide, which comprises reacting iodine in the presence of a solvent for either iodine or hydrogen iodide or a common solvent for both with hydrogen at a temperature of 150° C., and a pressure of about 700–800 pounds per square inch.

6. A process for the preparation of hydrogen iodide, which comprises reacting iodine in the presence of water with hydrogen.

7. A process for the preparation of hydrogen iodide, which comprises reacting iodine in the presence of water with hydrogen at elevated temperature and pressure.

8. A process for the preparation of hydrogen iodide, which comprises reacting iodine in the presence of water with hydrogen at a temperature between 100° C. and 300° C., and under pressures above atmospheric.

9. A process for the preparation of hydrogen iodide, which comprises reacting iodine in the presence of water with hydrogen at a temperature between 150° C. and 200° C., and at pressures of over 200 pounds per square inch.

10. A process for the preparation of hydrogen iodide, which comprises reacting iodine in the presence of water with hydrogen at a temperature of 150° C., and a pressure of about 700–800 pounds per square inch.

11. A process for the preparation of hydrogen iodide, which comprises reacting iodine in the presence of a solvent for either iodine or hydrogen iodide or a common solvent for both with hydrogen in the presence of a catalyst.

12. A process for the preparation of hydrogen iodide, which comprises reacting iodine in the presence of a solvent for either iodine or hydrogen iodide or a common solvent for both with hydrogen at elevated temperature in the presence of a catalyst.

13. A process for the preparation of hydrogen iodide, which comprises reacting iodine in the presence of a solvent for either iodine or hydrogen iodide or a common solvent for both with hydrogen at a temperature between 150° C. and 200° C., and at pressures of over 200 pounds per square inch in the presence of a catalyst.

14. A process for the preparation of hydrogen iodide, which comprises reacting iodine in the presence of water with hydrogen in the presence of a catalyst.

15. A process for the preparation of hydrogen iodide, which comprises reacting iodine in the presence of water with hydrogen at elevated temperature and pressure in the presence of a catalyst.

16. A process for the preparation of hydrogen iodide, which comprises reacting iodine in the presence of water with hydrogen at a temperature between 150° C. and 200° C., and at pressures of over 200 pounds per square inch in the presence of a catalyst.

17. A process for the preparation of hydrogen iodide, which comprises reacting iodine in the presence of water with chromic chloride present as a catalyst.

18. A process for the preparation of hydrogen iodide, which comprises reacting iodine in the presence of water with chromic chloride present as a catalyst, at elevated temperature and pressure.

19. A process for the preparation of hydrogen iodide, which comprises reacting iodine in the presence of water with hydrogen at a temperature between 150° C. and 200° C., and at pressures of over 200 pounds per square inch with chromic chloride present as a catalyst.

Signed at Perth Amboy in the county of Middlesex and State of New Jersey this 30th day of January A. D. 1930.

PAUL E. WESTON.